Figure 1:
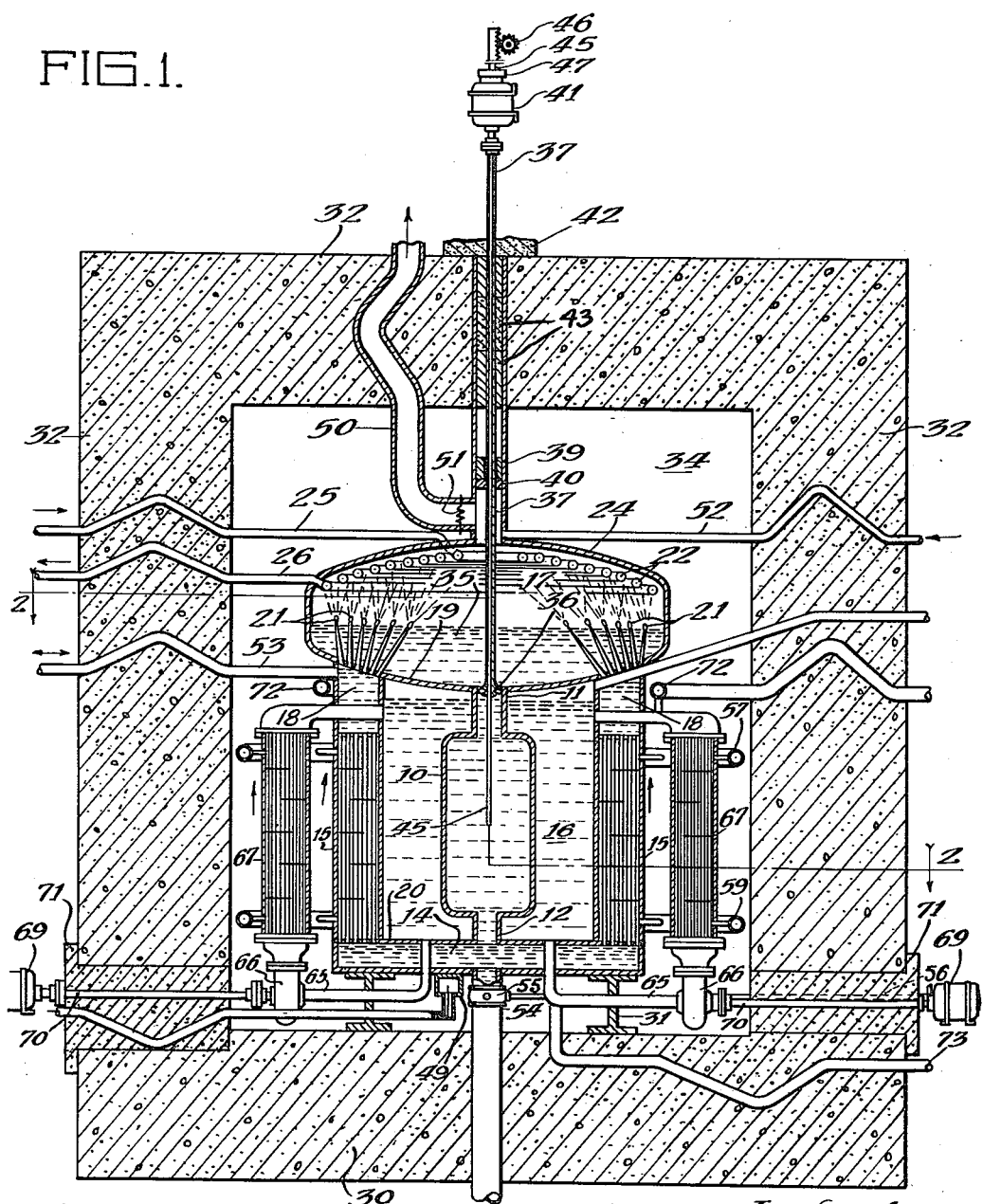

Dec. 3, 1957 E. P. WIGNER ET AL 2,815,321
ISOTOPE CONVERSION DEVICE
Filed Nov. 13, 1945 2 Sheets-Sheet 2

Witnesses:
Herbert E. Metcalf
Estill E. Ezell

Inventors:
Eugene P. Wigner
Gale J. Young
Leo A. Ohlinger
By Robert A. ———
Attorney

United States Patent Office 2,815,321
Patented Dec. 3, 1957

2,815,321
ISOTOPE CONVERSION DEVICE

Eugene P. Wigner, Leo A. Ohlinger, and Gale J. Young, Chicago, Ill., assignors to the United States of America as represented by the United States Atomic Energy Commission Application November 13, 1945, Serial No. 628,322

6 Claims. (Cl. 204—193.2)

The present invention relates to nuclear physics and more particularly to an improved means and method of converting an isotope fissionable by slow neutrons to another or the same fissionable isotope in a neutronic reactor, with a high conversion factor.

It is known that a self-sustaining chain reaction can be obtained in devices known as neutronic reactors utilizing natural uranium, as a result of slow neutron fission of the $U^{235}$ content of the natural uranium. In such reactors, discrete bodies of natural uranium of high purity are disposed, usually in the form of a lattice arrangement of spheres or rods, in a neutron moderator such as graphite, beryllium or heavy water of high purity, surrounded by a neutron reflector. Neutron absorption in the $U^{238}$ content of the natural uranium during the reaction leads to the production of the transuranic isotope $94^{239}$, known as plutonium (symbol Pu), which is fissionable in much the same manner as $U^{235}$. $94^{239}$ is formed in neutronic reactors utilizing natural uranium in accordance with the following process:

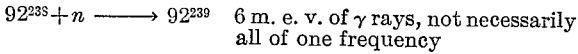

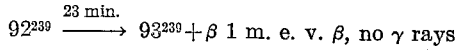

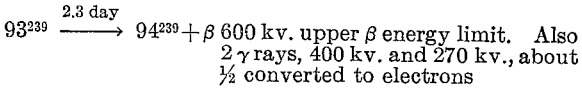

A small portion of the $94^{239}$ produced may also be changed to $94^{240}$ by absorption of neutrons. The neutronic reactors referred to above may be called "isotope converters" in that one fissionable isotope is formed ($94^{239}$) as another fissionable isotope ($U^{235}$) is used up. However, this conversion is not complete, and the natural uranium, which in this case acts to supply both the reaction isotope ($U^{235}$) and the absorption isotope ($94^{239}$), will contain two different fissionable isotopes after the reaction has been started. Certain presently known uranium graphite reactors have been found to have a conversion factor of .78, $U^{235}$ to $94^{239}$.

To obtain a more complete conversion of one fissionable isotope to another it is preferred to utilize a substantially pure fissionable isotope for the neutronic reaction, and then form the new fissionable isotope separately, from a substantially pure non-fissionable isotope which in turn can be substantially completely converted to a fissionable isotope fully recoverable in high purity and concentration.

An object of the present invention is to provide a means and method of converting an element into a fissionable isotope that can be recovered substantially completely and in high purity and concentration by means of a neutronic reaction in which the fissionable isotope supporting the reaction can be substantially completely converted.

The plutonium produced by neutronic reactors using natural uranium to support the reaction is useful for many purposes, but it has one outstanding advantage over, for example, the use of $U^{235}$, as it exists in natural uranium. As plutonium is a different element from uranium, it can be chemically removed from the irradiated natural uranium, and because of that fact can be obtained in substantially pure form and in high concentrations, whereas $U^{235}$ can only be obtained in high concentration or substantially pure form (as far as presently known), by the much more difficult process of isotope separation. $U^{235}$ of high concentration, however, has been used to sustain a neutronic reaction.

In high concentrations or substantially pure form, plutonium can also be used, when properly combined with a neutron moderator, to sustain a slow neutron chain reaction in a neutronic reactor of small size wherein the neutron leakage is high. In other words, it can be used as an efficient source of large quantities of neutrons, and the neutrons thus produced can be used to produce another fissionable isotope with higher conversion efficiencies than heretofore attained.

In addition, $U^{233}$, still another fissionable isotope, can be formed by irradiating non-fissionable thorium ($90^{232}$) with slow neutrons according to the following process:

$$_{90}Th^{232} + n \longrightarrow {_{90}Th^{233}} + \text{gamma rays}$$

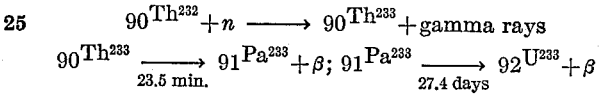

The chemical separation of $U^{233}$ from thorium is readily accomplished with high purity. The fissionable isotope $U^{233}$ will support a chain reaction, and has many desirable qualities. In particular, $U^{233}$ gives a relatively high average neutron yield per fission, the value as presently known being about 2.37–2.4 neutrons per fission (average).

All of the above isotopes can be used as reaction isotopes in isotope converters. However, as $U^{235}$ is difficult to obtain by isotope separation, $U^{233}$ and $94^{239}$ are the most readily available reaction isotopes for use in substantially pure form, and are preferred materials.

As to non-fissionable isotopes which can be converted substantially entirely to fissionable isotopes by neutron absorption, $U^{238}$ and $90^{232}$ can be used. Here again, $U^{238}$ is difficult to obtain free from $U^{235}$, whereas $90^{232}$ existing in nature as thorium, converts by slow neutron absorption to $U^{233}$, with chemical separation being readily accomplished. Consequently, thorium-$90^{232}$ is preferred as the absorption isotope, with the produced fissionable isotope being $U^{233}$.

From the above discussion, it will be seen that the following uncomplicated conversions can be made, with Nos. 1 and 2 as the preferred types.

|     | Reaction Isotope | Absorbing Isotope | Produced Isotope |
| --- | --- | --- | --- |
| (1) | $94^{239}$ | $90^{232}$ | $92^{233}$ |
| (2) | $92^{233}$ | $90^{232}$ | $92^{233}$ |
| (3) | $92^{235}$ | $90^{232}$ | $92^{233}$ |
| (4) | $92^{235}$ | $92^{238}$ | $94^{239}$ |
| (5) | $92^{233}$ | $92^{238}$ | $94^{239}$ |

Other but more complicated conversions can be made, as will later be brought out.

With proper precautions during the conversion to prevent excessive neutron losses, conversion factors close to unity can be obtained.

When neutron losses can be reduced to the minimum, and when a fissionable isotope giving an average neutron yield per fission of substantially over two, such as $U^{233}$ is used to support the reaction, conversion factors above unity may be obtained in a converter wherein $U^{233}$, for example, is fissioned to produce $U^{233}$. This type of improved converter is known as a breeder reactor and is specifically no part of the present invention except insofar as the generic method and structure as claimed herein can be utilized therein, the present application being generic to both types.

The presently described method for obtaining high conversion factors is based on several principles, as follows:

(1) The use in a reaction zone of a substantially pure fissionable isotope to provide a high K factor thereby leading to a reactor of small size and high neutron leakage.

(2) The use of a neutron moderator having a small neutron age to obtain a reactor of small size and high neutron leakage.

(3) The use of an absorber isotope positioned in an absorption zone to intercept the maximum possible number of escaping neutrons in a relatively small amount of absorber.

(4) The use of a structure and materials providing low parasitic neutron losses.

As pointed out above, one principle on which the present type of converter if founded is that the reaction isotope shall be in substantially pure form. In any neutronic reactor, the ratio of fast neutrons produced by fission in one generation to the original number of fast neutrons in a theoretical system of infinite size where there can be no exterior loss of neutrons is called the neutron reproduction factor of the system, and is denoted by the symbol K. In any finite system, some neutrons will escape from the periphery of the system. Consequently, a system of finite size may be said to have a K factor, even though the value thereof would only exist if the system, as built, were extended to infinity without change in composition. Thus, when K is referred to herein as a constant of a system of practical size, it always refers to what would exist in the same type of system of infinite size. In this way, it can be seen that the K factor for systems in which a pure fissionable isotope is used can be in theory equal to the average number of neutrons per fission, by neglecting neutron absorption in impurities and neutron absorption in the moderator and in the fissionable isotope. When a substantially pure reaction isotope is used, it can be replenished as it is destroyed by fission and thus be completely converted. Thus, when a high K factor is used, the size of the reactor can be greatly reduced before the neutron reproduction ratio reaches unity.

However, to obtain the smallest reactors, the moderator used should have a small neutron age, which is defined as being proportional to the root mean square distance a neutron travels in a reacting composition from its birth by fission until it is slowed to thermal energies. The value of the neutron age roughly determines the minimum size of the reactor when the maximum amount of fissionable isotope is used within the structure of minimum size, as determined by moderator characteristics. For this reason, it is customary to evaluate the reactivity of reactors using fissionable isotopes of high concentration in terms of the amount of fissionable isotope used in the reactor. Size alone is not definitive of proper operating conditions as the amount of fissionable material in a structure over minimum size determines the reactivity of the structure. Consequently, critical mass and operating mass is given in terms of grams of fissionable isotope in the reactor or in terms of density of the isotope in the moderator. Light water and heavy water both have small neutron ages and lead to small reactors when used as moderators. A chain reaction in such small reactors can have neutron leakages out of the reaction zone on the order of 50 percent of the neutrons generated during the chain reaction.

If a breeder reactor is to be constructed then $D_2O$ should be used as a moderator, as neutron absorption in $D_2O$ is negligible. However, $D_2O$ is expensive and light water ($H_2O$) can be used in converters when no absolute necessity for a quantitative isotope "profit" appears, whereas in breeder reactors, by definition, a quantitative isotopic profit must be made. The term water is used herein as a generic term to include both $H_2O$ and $D_2O$.

$U^{233}$ and $94^{239}$ may be dispersed in water as soluble uranyl and plutonyl ($PuO_2^{++}$) salts, such as uranyl and plutonyl nitrate, sulphate or fluoride, or as an alkali metal uranyl or plutonyl carbonate. Such a solution with the proper isotope concentration in water of either type and in a container of the proper size will sustain a chain reaction with a low neutron loss except for exterior neutron leakage, which will be very high.

A third preferred principle to be followed in constructing converters of high conversion factors is to insure the result that the greatest possible number of the leakage neutrons, i. e., those not required for the chain reaction, are usefully absorbed, such as in thorium leading to the production of $U^{233}$. This is accomplished, for example, by surrounding the reaction zone as completely as possible with an absorbing zone, comprising, for example, a thick layer containing the absorbing isotope, with the layer preferably also having reflecting and moderating properties due to the use of water mixed with the absorber.

While the absorbing zone should have a minimum thickness in order that neutrons of high energy be slowed down in the zone and be absorbed before escape, it is desirable to keep the total amount of absorber as low as possible with respect to the number of neutrons being absorbed. When a reactor of large size is used as a neutron source, then the minimum thickness of the absorbing zone should be the same as when a small reactor is used. However, as the absorbing zone must substantially completely enclose the reaction zone, much more of the absorber must be used when reactors of large radius are used, and this factor complicates removal of the produced isotope. Comparing a large reactor and a small reactor operating with substantially the same total neutron leakage, it can be seen that the amount of the new isotope produced in each case will be about the same, but that in the case of the larger reactor the newly produced isotope will be distributed throughout a much larger amount of absorber isotope. All of the absorber isotope will have to be processed to recover the produced isotope and in the case of the smaller reactor only the smaller amount of the absorber will have to be processed to recover the same amount of produced isotope. This factor is doubly important where the size of the reactor is such that the percentage of produced isotope to total absorber isotope remaining is so low that resort must be had to carrier chemistry to recover the produced isotope. Therefore, a small size due to use of substantially pure fissionable isotope is important not only in providing a high leakage factor, but also in enabling the volume of the absorber isotope to be reduced. A high relative density of produced isotope is formed therein, leading to relatively easier chemical removal processes.

For example, in the reactor herein described about 6½ metric tons of slurry are used, in an absorbing zone 38 to 50 cms. thick. In natural uranium-graphite reactors an absorbing zone of 50 cms. thickness would use 177 metric tons of slurry with a thorium content of 1.0 gm./cc.

While many of the parasitic neutron losses can be reduced by known methods, several of the parasitic neutron losses in a converter of the type described herein can be materially reduced by particular disposition of the absorbing isotope with respect to the reaction isotope.

In neutronic reactors of the solution type operated at elevated powers, it is desirable to circulate the reaction solution outside of the reactor in order to obtain release of gases from the solution, to cool the solution and then return it to the reactor. As about 1 percent of the neutrons emitted in fission are delayed, such circulation indicates that many of these delayed neutrons will be released outside of the reaction zone. When the solution is outside of the reaction zone, it can be conveniently thought of as being in a circulation zone.

Another object of the present invention is to provide a means and method of usefully utilizing at least a part of the delayed neutrons in a converter emitted when the reacting component is in a circulation zone.

Furthermore, in conversion reactors where the absorption isotope substantially surrounds the reaction zone, fissions may take place in the already formed new fissionable isotope at or near the periphery of the absorbing zone. When this happens fission neutrons can travel outwardly and be lost for either reaction or absorption. This loss can be reduced by surrounding the absorbing zone with a neutron reflecting material, which in this instance can be the reaction solution itself as it is being circulated outside of the reaction zone.

It is therefore another object of the present invention to provide an isotope converter wherein a maximum number of leakage neutrons are directed to an absorption zone.

Broadly speaking, therefore, the objects of the present invention are accomplished as to method by first almost completely and closely surrounding the reaction zone with an absorption zone, and then circulating the reaction zone composition outside the reaction zone over a path substantially completely and closely surrounding the absorption zone.

One preferred apparatus embodiment is a neutronic reactor having a reaction tank of small size to increase neutron leakage, this small size being obtained by using as a reaction composition a substantially fissionable isotope of high concentration or purity in water, light or heavy, with the reaction zone surrounded as completely as possible and closely with an absorber isotope such as thorium. The reaction composition is circulated outside of the reaction zone, cooled and purified in a circulation zone completely and closely surrounding the absorbing zone, and then returned to the reaction zone.

Figure 2:
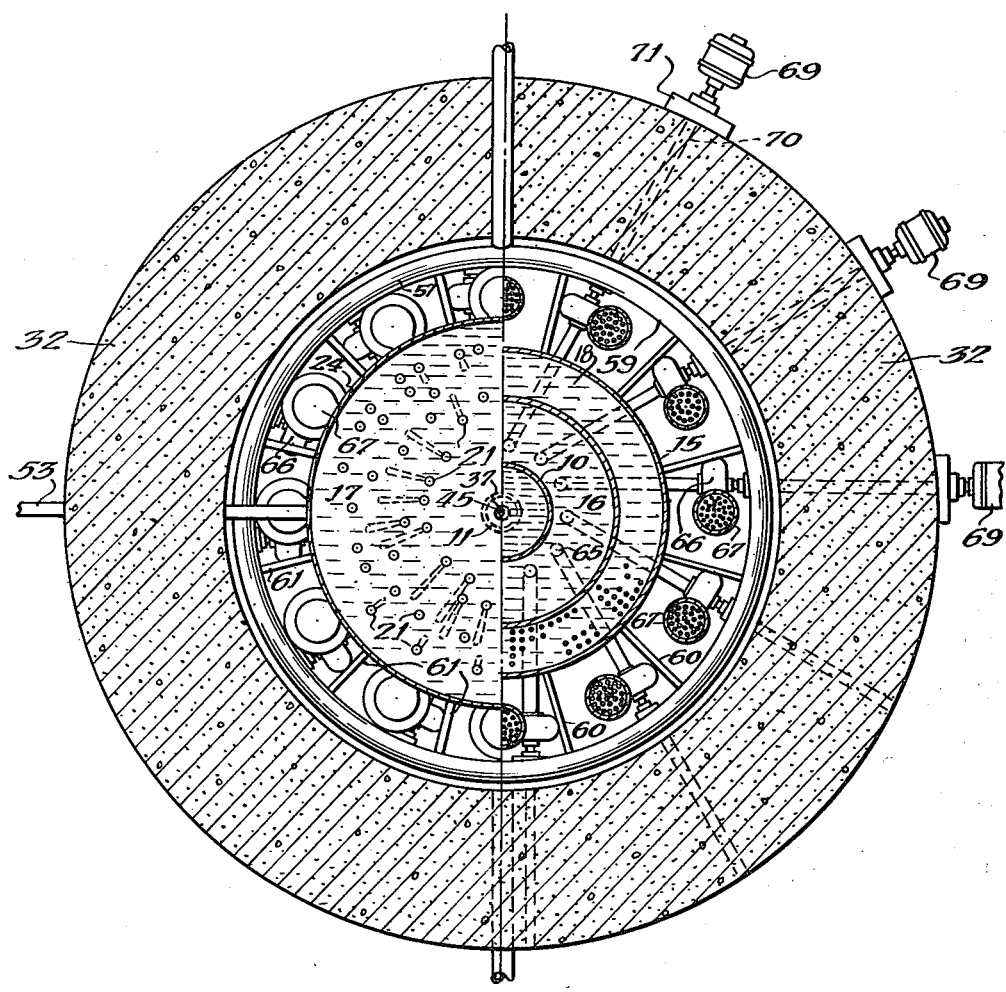

The present invention may be more fully understood by reference to the drawings in which:

Fig. 1 is a diagrammatic vertical section view partially in elevation of one preferred embodiment of the present invention; and Fig. 2 is a cross-section taken through two levels of the device of Fig. 1 as indicated by the line 2—2 in Fig. 1.

In order to accomplish this process, apparatus is used whereby parasitic neutron losses are greatly reduced.

Referring to the drawings, which illustrate a solution-type reactor surrounded by an absorbing slurry, a vertical, elongated cylindrical reaction tank 10, 120 cm. in diameter and 260 cm. high, is provided with an upper solution inlet pipe 11 and a lower outlet pipe 12. Outlet pipe 12 enters a stocky cylindrical solution distributor or outlet tank 14 extending outwardly beyond the extent of the reaction tank 10 to support and connect with the tubes of a heat exchanger 15 concentrically surrounding the reaction tank 10. The heat exchanger is contained in a conduit means 18 connecting the inlet tank 17 and outlet tank 14. The heat exchanger 15 is spaced from the reaction tank 10 to provide a slurry space or container 16 between the reaction tank 10 and the heat exchanger 15 that completely surrounds the reaction tank 10 except for inlet and outlet pipes 11 and 12, respectively.

Just above the reaction tank 10, the inlet pipe 11 enters a cooling solution inlet tank 17, the bottom 19 of which extends laterally to rest on the top edges of the solution heat exchanger 15. Cooling tank 17 receives solution from the top of the heat exchanger 15 through a plurality of upwardly directed nozzles 21, the solution from the nozzles 21 being projected against a cooling coil 22 positioned just below top 24 of cooling tank 17. Coolant is supplied by coil inlet 25 and coil outlet 26. As shown by Fig. 1, the cooling solution inlet tank 17 has a wall 19 in common with a portion of the wall of the container 16 and the outlet tank 14 has a wall 20 in common with a portion of the wall of the container 16.

The combination of solution distributor 14, inner reaction tank 10, outer heat exchanger 15, and upper cooling tank 17 is supported on a foundation 30 such as concrete, by beams 31, and shield walls 32 of neutron and gamma ray absorbing material are projected upwardly and across the top of the combination to define a reactor space 34. Thick concrete can be used for walls 32.

The reactive solution 35, to be used in tank 10, is circulated by an axial flow impeller 36 positioned in inlet pipe 11 near the bottom 19 of cooling tank 17. Impeller 36 is driven by a hollow shaft 37 extending upwardly in an axial shaft pipe 39 entering cooling tank 17. Gas passage along shaft pipe 39 is blocked a short distance above cooling tank 17 by packing 40. Hollow shaft 37 continues upwardly through shield 32 to an impeller motor 41 positioned outside of the shield 32. Radiation through shaft pipe 39 is blocked by a lead cover 42 and steel and hydrogenous shielding 43.

Impeller motor 41 has a hollow central shaft, thus providing a bore through which a control rod 45 extends through the motor 41. The rod 45 also extends through the hollow shaft 37 to enter the reaction tank 10. The rod 45 is movable vertically by use of rack and pinion 46 to insert more or less of the rod 45 into the reaction zone, as desired. Gas leakage around control rod 45 is prevented by the use of a stuffing box 47 between the motor and the rack and pinion. The portion of the control rod 45 insertable into the reactor incorporates a neutron absorber of high neutron capture cross-section such as cadmium, boron carbide, or boron steel. The neutron density during operation can conveniently be monitored, as by ionization chamber 49.

A gas outlet 50 leaves axial shaft pipe 39 between the cooling tank 17 and packing 40 and extends upwardly through the shield 32 for release of non-condensible gases. Dissociation gases such as $H_2$ and $O_2$ or $D_2$ and $O_2$ are recombined, as for example, by a burner indicated diagrammatically as a filament 51. The water so recombined runs back into cooling tank 17. Gas dilution to prevent explosions is supplied by dilution gas pipe 52 entering shaft pipe 39 between the cooling tank 17 and gas outlet 50.

Solution is normally supplied to or removed from the solution circulation zone through solution pipe 53 attached to the top of heat exchanger 15. Solution can be more quickly removed from the system by an axial dump pipe 54 entering the bottom of solution distributor 14 under the control of dump valve 55 operated by extended valve shaft 56. The use of dump valve 55 will be later explained.

Coolant is supplied to heat exchanger 15 from an inlet manifold 57 and is discharged into an outlet manifold 59, being connected thereto by solution coolant inlets 61 and solution coolant outlets 60, respectively (Fig. 2).

Thus, when solution is placed in the system, any heat of reaction developed in reaction tank 10 will be removed first by heat exchanger 15 and second by vaporization, condensation and cooling in cooling tank 17 due to the action of nozzles 21 and cooling coil 22.

The slurry to be placed in slurry space 16 is also circulated and cooled. A plurality of slurry outlet pipes 65 each connect the bottom of slurry space 16 with a slurry pump 66, discharging into a slurry heat exchanger 67 which discharges into slurry space 16 at the top thereof. These exchangers 67 are positioned outside of and around exchanger 15. Pumps 66 are driven by pump motors 69 positioned outside of shield 32, each motor and pump being connected by a pump motor shaft 70 extending through shield 32 in a removable plug 71. Slurry can be taken out of the system by means of slurry removal manifold 72 connected to the tops of the heat exchangers 67, and introduced into the system by slurry inlet pipe 73 connected to one of the slurry outlet pipes 65. Coolant is supplied to the slurry heat exchangers 67 from the water manifolds 57 and discharged by manifold 59.

In operation, the control rod 45 is inserted to maximum neutron absorbing position in the reaction tank 10. A reactive composition of fissionable isotope and liquid moderator is inserted in the system through solution pipe 53 and the impeller 36 is rotated. Circulation of the reactive composition is then established through the reaction tank 10, and the heat exchanger 15. Water is circulated through the heat exchanger 15 as a coolant.

Slurry space 16 may be filled with a thorium-$D_2O$ slurry, for example, circulation started, and the device is ready for the start of the nuclear chain reaction. The control rod 45 is then slowly removed from the reaction tank 10 until a point is reached where the neutron reproduction ratio in the reactor tank 10 is greater than unity. The fissionable isotope density in the liquid has been previously determined to be such that, for the size of the tank used, operating conditions are obtained where the reproduction ratio is below unity and above unity for different positions of the control rod. The chain reaction can then be allowed to proceed until a predetermined operating power has been reached with the reproduction ratio above unity. At this power where the heat of the reaction is removed by the heat exchangers to stabilize the operating temperature, the control rod 45 is moved to the position where the reproduction ratio is unity, thereby stabilizing the reaction at the power attained. Slight movements of the control rod then serve to maintain operating power.

During operation, the fissionable isotope is used up in fission as it passes through the reaction tank. Fission products are released, these products being radioactive and neutron absorbing. Consequently, either at intervals or continuously some of the reaction composition is drawn off through solution pipe 53, purified, fortified to proper isotope density, and returned to the reactor. Likewise, the slurry carrying the absorber is periodically withdrawn for chemical extraction of the produced fissionable isotope and purification of the slurry. A slurry having a $ThO_2$ particle size of .01 to 1 micron is stable and has good viscosity for circulation.

Having described the apparatus used, the specific details of the method will now be set forth more completely. It is important to note here that the present invention is primarily directed to the overall conversion of a fissionable isotope to a fissionable isotope with a high conversion factor and that the heat developed in the reaction is not necessarily utilized. A converter can also use the heat of reaction to produce power by modification of structure. In the present invention, use of the heat of the reaction will be ignored.

In the specific example described, the reaction tank 10 has a volume of about 3 cubic meters and contains 1 gm. Pu per liter $D_2O$. This concentration of plutonium in heavy water in the reaction tank 10 having the dimensions previously mentioned, will support a sustained chain reaction therein independently of any neutrons supplied from outside the reaction tank and regardless of the amount of thoria contained by the slurry. This $94^{239}$ can be dissolved in the moderator in the form of a salt such as the nitrate, sulphate or fluoride, and is circulated through the reactor at a high rate. Under these circumstances, the reactor can operate at high power continuously.

The amount of fissionable isotope which should be present in reaction tank 10 in order to establish a self-sustaining neutron chain reaction depends to a substantial degree upon the concentration of the fissionable isotope in the moderator, upon the shape of the tank, and also upon the neutron absorption characteristic of the moderator used. In general, it can be said that the amount of $94^{239}$ present should be at least about 200 grams with optimum concentration and using pure $94^{239}$. The exact amount required will also depend upon the fissionable isotope which is used.

The following table tabulates the critical mass which is required for various concentrations of plutonyl sulphate solution in $D_2O$ using an infinite $D_2O$ reflector. In the table, Z denotes the number of atoms of $Pu^{239}$ present per molecule of $D_2O$ and G denotes the critical quantity of $Pu^{239}$ required in grams. $V_x$ is the critical volume in liters.

| $Z \times 10^{-3}$ | 0.1 | 0.2 | 0.25 | 0.3 | 0.5 | 1.0 | 2.0 |
|---|---|---|---|---|---|---|---|
| $V_x$ Liter | 180 | 80 | 62 | 51 | 32 | 18 | 11 |
| G gm | 290 | 210 | 205 | 205 | 210 | 240 | 290 |

From the above data it is shown that a minimum critical mass can be as low as about 200 grams of $94^{239}$ and be capable of sustaining a reaction in a $D_2O$ moderator with an infinite $D_2O$ reflector. Not less than about 300 grams of $U^{235}$ would be required were $U^{235}$ (12.5 percent $U^{235}$ in $U^{238}$) to be substituted for the 94 in the above solution. $U^{233}$ values are approximately the same as $94^{239}$ values.

The variation in critical mass which is required to sustain a neutron chain reaction depends to a very substantial degree upon the nature and thickness of the neutron reflector.

Amounts of the fissionable isotope required will be larger than given above when surrounded by an absorbing-reflecting layer as described herein.

Critical size and mass with $ThO_2$—$D_2O$ absorbing zone (spherical reactor):

| $Cm.^3 D_2O$ per gram $94^{239}$ | Radius in cm. | Kg. $94^{239}$ |
|---|---|---|
| 100 | 33.8 | 1.62 |
| 200 | 38.6 | 1.20 |
| 300 | 42.9 | 1.11 |
| 400 | 46.1 | 1.07 |

From the above data, it will be apparent that no hard and fast figure for critical mass may be given since the mass will vary with the nature of the moderator, nature of the fissionable isotope, concentration in moderator, nature and depth of reflector as well as concentration of impurities including $U^{238}$ or $Th^{232}$.

Generally speaking, however, not less than about 200 grams of the fissionable isotope is required using the best of moderators and securing maximum neutron reflection at optimum concentration. Where ordinary water is used not less than about 300 grams of fissionable isotope will be required and where the fissionable isotope is $U^{235}$, the minimum critical mass for the best available moderator will be at least about 300 grams and for water it will be at least about 500 grams. These masses must be increased with increasing concentration of impurities and also with variation in the concentration and neutron reflection of the system. Moreover, the actual amounts used in a reactor are somewhat higher since the reactor is desired to be larger than critical size, and in the present instance is cylindrical.

The reactors herein contemplated are operative when using as preferred materials pure fissionable isotopes such as pure $U^{233}$, pure $94^{239}$, etc. However, such purity is not necessary in conversion and frequently it may be desirable to conduct the reaction in the presence of an isotope capable of absorbing neutrons to yield a further quantity of fissionable isotope as the reaction proceeds. Thus, uranium containing $U^{238}$ in concentrations, for example, about 5 to 99 percent, the balance being $U^{235}$, offers certain advantages since $U^{238}$ is converted to $94^{239}$ which aids $U^{235}$ to support the reaction. The same is true when $Th^{232}$ is used in lieu of $U^{238}$, as $U^{233}$ is formed during the reaction.

From the above description it can be seen that fissionable isotopes when used in concentrations in a moderator higher than concentrations obtainable naturally can be used to create a self-sustaining chain reaction in a very small reactor, with amounts only on the order of a kilogram of the fissionable isotope. This reactor can then be used to supply the desired neutrons to the absorbing zone of a converter, as herein shown, described and claimed.

In a reactor of the type above described, the main neutron losses may be enumerated as follows:

(1) Delayed neutrons that may be released outside the reaction zone during circulation of the solution.

(2) Neutron absorption by materials present in the reaction zone, such as the moderator and anion in case of solution.

(3) Neutron absorption by fission and corrosion products in the reaction zone.

(4) Neutron absorption in the reactor tank.

(5) Neutron escape from the reaction zone in wrong direction.

(6) Neutron absorption by non-fissionable isotopes formed, including intermediate isotopes, such as protoactinium when thorium is the absorbing isotope.

(7) Neutron absorption by fission products and corrosion products in the absorbing zone.

(8) Neutron escape from the absorbing zone particularly of neutrons formed by fission in the reflectors.

The losses enumerated above and their relationship to the structure herein described will be separately discussed below.

(1) In any reactor where the reaction composition is circulated outside of the reaction zone, delayed neutrons are lost to the reaction if they are released while outside of the reactor. About 1 percent of the neutrons emitted as a result of fission are delayed. Since all of the delayed emission periods, except the first one, are long compared with the uninterrupted sojourn of the $U^{233}$ within the reactor, the percentage of delayed neutrons emitted outside the reactor will be equal to the neutron isotope holdup outside the reactor divided by the total amount of reaction isotope.

The holdup has been somewhat reduced by using an axial flow impeller in the liquid inlet to the reaction tank eliminating a pump holdup. It is preferred to have a substantial holdup, however, in the cooling tank 17 in order that gases formed in the reaction can be readily separated from the solution before it is returned to the reaction zone. In the structure shown and described herein, delayed neutrons emitted while outside the reactor tank 10 are not wholly lost, because the absorbing zone is completely and closely surrounded by the solution while it is outside of the reaction tank 10. In this manner, a significant portion of the delayed neutrons emitted while the solution is outside of the reaction zone can enter the absorption zone through the walls separating the zones. Thus, in the structure shown herein, the absorption zone receives fission neutrons both internally from the reaction zone and externally from the circulation zone.

(2) Absorption in the moderator itself will be low when $D_2O$ is used, somewhat higher if $H_2O$ is used. However, the absorption by the anion also has to be taken into consideration. If the fissionable isotope is used in the form of the nitrate, the nitrogen of the nitrate alone will give a small neutron loss. The nitrate is preferred as it does not give products, under irradiation, which could gum the circulation system. The sulphate, which has negligible neutron absorption, may under certain conditions, precipitate sulphur in the system, although some of this precipitation can be prevented by addition of peroxide to the solution. While the fluoride can be used, it is difficult to avoid precipitation of the peroxide at concentrations of hydrofluoric acid which are tolerable from the point of view of corrosion. Altogether, however, the parasitic losses in the solution are low when a substantially pure isotope is used.

(3) The use of the fissionable isotope in solution greatly aids elimination of xenon 135, a gaseous neutron absorbing "poison" developed during the operation of a neutronic reactor. This poison has an important effect on operation of neutronic reactors.

In neutronic reactors operating at high neutron densities, radioactive elements of exceedingly high capture cross-section are formed relatively quickly in the composition as an intermediate element in the decay chains of the fission fragments. One of the most important of these decay chains is believed to be the 135 fission chain starting with tellurium, as follows:

Te(short) $\longrightarrow$ I(6.6 hr.) $\longrightarrow$ Xe(9.4 hr.) $\longrightarrow$
half life    half life    half life

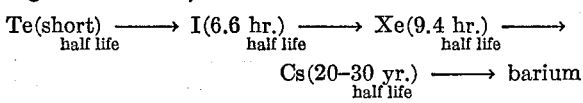

The neutron absorptions of tellurium, iodine, caesium and barium are relatively unimportant, but the neutron capture cross-section of radioactive xenon 135 has been measured to be about $2,500,000 \times 10^{-24}$ cm.$^2$, many times larger than that of stable gadolinium, for example, the cross-section of which is about $30,000 \times 10^{-24}$ cm.$^2$. Upon absorption of a neutron, xenon 135 shifts to xenon 136, an element of relatively small capture cross-section.

The rate of production of the originating fragment of the 135 chain is a function of the neutron density in which the fissionable isotope is immersed, and therefore dependent upon the power at which reactors of given type are operated. The radioactive xenon 135 is produced with a noticeable effect on the reaction a few hours after the reaction is started and the effect is, of course, greater as the neutron density is increased and maintained. The xenon 135 effect on the operation of high power reactors when the xenon remains in the reactor can be summarized as follows.

The reaction is started by withdrawing the control rod. The neutron density rises at a rate determined by the reproduction ratio and the effect of the delayed neutrons, until some predetermined neutron density is attained. The control rod is then placed in the unity reproduction ratio position and the reaction is stabilized at the power desired. During this time the radioactive iodine is formed decaying to xenon 135. As more and more iodine decays, more and more xenon 135 is formed, this xenon 135 absorbing sufficient neutrons to reduce the reproduction ratio. This absorption also converts the xenon 135 to xenon 136 which has no excessive capture cross-section. The neutron density drops. If no compensation were made for this drop the neutron density might drop until background conditions prevailed, and then the reaction might automatically start up as the xenon 135 decayed. Normally, the neutron density drop is compensated for by removal of the control or equivalent rod to a new position where the reproduction ratio is again above unity. A neutron density rise occurs, bringing the density back to its former level. Again, more xenon 135 is formed and the process is repeated until an equilibrium condition reached where the xenon 135 formed is transmuted by neutron absorption and by decay into isotopes of lower capture cross-section as fast as it is being formed. In the meantime, the control rod (or equivalent) has to be withdrawn by an amount to remove from the reactor neutron absorbers at least equal in effect to the absorption caused by the equilibrium amount of xenon 135. This requires a large initial reactor size to make the reaction possible with the xenon in the reactor. In the converter herein described, however, a large portion of this gaseous neutron absorber can be removed and the reactor kept small in size. For example, in the solution reactor above described, and operating for example at 100,000 kw., about 100 grams of $94^{239}$ will undergo fission each day, and the amount of xenon 135 formed is about 3.3 gm. If this were permitted to remain in the system as long as one day, its total cross-section would be five times greater than that of all the $94^{239}$ present. In order to reduce the total xenon 135 cross-section to one percent of the total cross-section of the fissionable isotope, the xenon 135 formed should be eliminated about every five minutes, or as done here, continuously. The xenon 135, being gaseous, can be flushed out of the solution. This flushing is accomplished continuously by the structure described in that the solution is broken up into fine particles by nozzles 21 in cooling tank 17 and can thereby deliver the gaseous content of the solution to the space above the liquid surface, from which the non-condensible gases can be completely flushed out of the system by the use, for example, of helium circulation through pipe 52.

However, xenon 135 is not the only non-condensible gas produced in the reaction zone during operation. Many other fission products have decay, and daughter decay, chains including gaseous components later decaying to solids. By removal in gaseous form a substantial elimination of these other fission products is obtained that might otherwise eventually poison the reaction.

In addition, nuclear fission of isotopes dissolved in water causes a substantial amount of disintegration or dissociation of the water. The presently described reactor operating for example at 100,000 kw. can release several hundred liters of STP hydrogen (deuterium)-oxygen mixture per second. These gases have a desirable effect in that they carry the xenon and other gaseous fission products with them. Explosions are prevented by dilution of the O-D gases by helium as they are swept out of the tank space in which they are released. The dissociation gases are recombined by ignition and returned to tank 17. Condensible gases are condensed by coil 22 and drip back into tank 17.

However, other radioactive fission products (in addition to those having gaseous stages of decay) with high cross-sections, such as samarium, are produced, and will cause a small neutron loss even if the solution is purified once a day. However, this loss can be tolerated and daily purification will also remove corrosion products before they can build up to any substantial loss factor and permit the replacement of the amount of fissionable isotope destroyed by fission.

With respect to purification of the solution, i. e., decontamination of the solution by removal of the remaining fission and corrosion products, a solvent extraction process has been found satisfactory when water is the $U^{233}$ solvent.

A $H_2O$ solution containing the fissionable isotope which has been reacted and therefore contains solid fission products, is pumped from the converter and made 1 N in $HNO_3$, and 10 N in $NH_4NO_3$. It is then charged to the center of a continuous counter-current extraction column. A suitable water-immiscible solvent, such as hexone or dibutyl carbitol, is charged to the column at the bottom and passes up through the water phase.

The fissionable isotope passes from the water solution into the organic solvent, which is separated at the top of the column. The water solution containing the fission products is passed out of the bottom of the column into waste. The organic solvent containing the fissionable isotope is next charged to a similar continuous counter-current extraction column at the bottom and re-extracted into a water solution of the composition used in the breeder pile. The columns are identical in construction, and the water layer from the bottom of the second column can be pumped directly back into the reactor or can be passed through further purification cycles as above, if needed.

When the fissionable isotope is dissolved in deuterium oxide, the extraction column is not used directly as the deuterium will exchange with the hydrogen of the solvent. In this case, the uranium salt is separated first from the heavy water, and then purified as above.

(4) Neutron absorption in the reactor tank itself is very important, as this tank is interposed between the reaction zone and the absorption zone. The tank absorption is, of course, principally determined by the tank material used. The neutron loss for an aluminum tank 1.5 mm. thick however is only about .01 neutron per fission, and correspondingly lower for tanks of lead or beryllium. With a thin aluminum tank, the thorium slurry outside of the reactor tank can be placed in immediate contact with the tank, as shown in Figs. 1 and 2.

(5) The use of the reactor surrounded by the absorbing zone, except for the solution inlet and outlet, reduces the escape of neutrons in the directions in which there is absorption to a minimum. The reactor in Figs. 1 and 2 may be said to be, in one sense, totally surrounded by reflecting material in that water is present in both inlet and outlet pipes 11 and 12, respectively. Parasitic neutron escape completely out of the system therefore is reduced.

Furthermore, the reactor shape in the present instance is not spherical and therefore not of minimum size. The reactor is cylindrical and elongated. As the neutron density in a neutronic reactor is highest in the center, the effect of elongation is to reduce the neutron density at the ends of the long dimension of the reactor where the inlet and outlet are located. In this manner, the neutron escape is greatest in line along the short dimension of the reactor midway between the ends thereof and least at the inlet and outlet points. The elongation of the reactor is therefore deliberate, in order to reduce parasitic neutron escape at the inlet and outlet ends of the reactor.

(6) During a chain reaction using a fissionable isotope in high concentration, other uranium isotopes may be formed. For example, $94^{240}$ may be produced from $94^{239}$ by absorption of a neutron (without fission) and radioactive decay. $U^{234}$ may be produced from $U^{233}$ in the same fashion. While the extent of formation of such isotopes and their absorption cross-sections and fission capabilities are not at present fully known, experimental evidence indicates a small loss of neutrons by absorption in non-contributing isotopes or uranium formed during reaction operation. This effect, however, only enters into the efficiency of the converter, not its overall operation as these losses can be compensated for by adding new supplies of the fissionable isotope.

Non-productive neutron absorption in the absorption zone, however, has a more serious effect. For example, protactinium is an intermediate stage between the thorium and the uranium isotope desired, and as far as is presently known is not fissionable. This element can cause a neutron loss in two ways. First, a neutron loss by the neutrons which Pa absorbs, and second, by formation of an element decaying into $U^{234}$ instead of into $U^{233}$, a known fissionable isotope. This effect however can be kept to a minimum by extracting the Pa from the slurry at sufficiently frequent intervals to reduce the absorption by the Pa to about .5 percent of the absorption by the thorium.

(7) Purification of the absorbing slurry is also indicated by the accumulation of fission and corrosion products therein. For example, the total neutron absorption cross-section of thorium is about 100 times smaller than the total neutron absorption cross-section of the reaction isotope. If the optimum amount of thorium in the reflector is divided by 100 times the amount of fissionable isotope in the reaction zone, the number is obtained by which the total cross-section of the thorium in the reflector is larger than the total cross-section of the reaction isotope. This number is about 4. On the other hand, the amount of fission in the reflector is less than 1 percent of the amount of fission in the reaction zone, when all the thorium is distributed uniformly in the reflector. The relative poisoning effect in the reflector by the fission products is, in consequence, about 400 times smaller than the poisoning by the fission products in the reactor, and a correspondingly less frequent purification will be sufficient for the elimination of the fission products. In consequence, the need for purifying the thorium in the reflector will arise primarily from the absorption by the Pa, and to reduce the holdup of $U^{233}$ that has been produced within the reflector. This latter factor will require a purification of the slurry at monthly intervals. This monthly purification will at the same time satisfy the requirement for removal of the intermediate Pa which can then be held for decay into $U^{233}$.

(8) There are several reasons for loss of neutrons from the absorbing zone. The escape of neutrons perpendicular to the outer surface of the reactor tank is governed by the tail of the slowing down density of neutrons. This means that the thickness of the absorbing zone should be about 38 cm. in all directions to reduce the total number of neutrons escaping outside the system to less than .5 percent of all neutrons entering the absorbing zone when the slurry is approximately equal parts by weight of thorium oxide and water.

Some fission of the $U^{233}$ formed in the absorption zone will take place in the absorption zone. When this happens in the inner portions of the slurry, no harm is done as the neutrons emitted are used either in the reactor or are slowed in the slurry and absorbed to form more $U^{233}$. However, when the fission of the $U^{233}$ takes place in the outer portions of the slurry some of the neutrons emitted may proceed outwardly and would escape, if other precautions were not taken. A neutron reflecting substance around the absorption zone is, in consequence, indicated. The solution itself, having a large percentage of moderator therein, is for that reason a good reflector, and, in addition is a regenerative reflector in that some fission can take place therein. The device of the present invention, therefore, by positioning the solution while in the circulation zone around and close to the absorbing zone, permits the use of that solution as a peripheral reflector for the absorbing zone while it is being circulated. Even the heat exchanger 15, when filled with solution and when water is used as a coolant will act as a reflector, although not to the same extent as the solution alone with only a single wall between the solution and the absorbing zone, as when in distributor 14 and cooling tank 17. Thus, the solution in the circulation zone as constructed as described above, not only permits delayed neutrons to reach the absorbing isotope, but also acts as a reflector to return escaping neutrons to the absorbing zone.

The converter as above described makes no use of the heat of the reaction. In order to maintain a high overall efficiency in the chain reacting system at least a portion of the heat developed should be used. While the heat exchanger coolant in the herein described system is available for space heating purposes, it is advantageous to be able to extract the heat in more usable form.

Several methods are available to produce power and still maintain a high conversion factor in a converter. For example, the dissociated gases can be burned to produce high temperature combustion gases, which in turn can be used to produce power, or the solution can be reacted under pressure, and flashed to steam in a separate lower pressure boiler, this action producing steam and simultaneously cooling the remaining solution, such as is more fully described and claimed in the co-pending application of H. C. Vernon, Serial No. 628,320, filed November 13, 1945. When power is produced in useful form the use of the $U^{233}$—$U^{233}$ conversion even when the conversion is less than unity becomes more attractive in that the non-fissionable isotope (thorium) will furnish the bulb energy with only a small loss of $U^{233}$ in the process.

While the herein described reactors have utilized substantially pure isotopes as preferred materials for the reactions, a conversion reaction can also be obtained in the same type of apparatus by using natural uranium, either as the reaction composition ($U^{235}$ content) or the absorbing composition ($U^{238}$ content).

In case absorber is the $U^{238}$ content of the natural uranium, it can be present both inside the reactor in the reacting solution of uranium salt in $D_2O$, and also can be present in the reflector, which in this case can be a $UO_2$—$D_2O$ slurry. During the course of the reaction, the $94^{239}$ will be formed both in the reaction tank and in the reflector slurry. When the $94^{239}$ is removed periodically from the reaction solution, some $U^{235}$ content of the uranium will remain, of course, but will be depleted, and at some point, dependent on $94^{239}$ production, will not support a chain reaction in $D_2O$. Under these circumstances, fresh natural uranium with full $U^{235}$ content must then be supplied to the reaction tank. The uranium depleted in $U^{235}$ is still perfectly suitable for use in the absorbing zone where the $92^{238}$ is the absorber. Fissions will take place in the $U^{235}$ content of the slurry, although, as pointed out above for $U^{233}$ in the reflector, at a much slower rate than in the reactor. Thus, the $U^{235}$ continues to be converted into $94^{239}$ via $U^{238}$ when it is in the reflector. The $94^{239}$ formed in the reflector is removed periodically, as in the thorium reflector and the residue replaced.

The same general conditions could, if desired, be accomplished in the $U^{233}$ thorium conversion reactors as previously described by placing some of the thorium within the reactor along with the $U^{233}$ as a slurry. There are several advantages to be gained, in that the number of neutrons which have to leave the reactor tank is reduced by a factor of about 3, and in consequence the losses in the tank wall and outside will be diminished by the same factor. With thorium, however, the difficulties of rapidly circulating the reactor slurry, and chemical separation difficulties make this type of reactor less desirable than when the pure isotopes are used in the reaction tank. While the converters using mixed isotopes are less desirable in certain cases, the structure used will be substantially the same. Consequently, the present application is intended to cover such use within the scope of the appended claims.

What is claimed is:

1. An isotope conversion device comprising a reaction tank, a thermally fissionable isotope dispersed in a liquid moderator in said reaction tank and in an amount sufficient to support a chain reaction, a container surrounding said reaction tank, an inlet and outlet for said reaction tank passing through said container, a non-thermally fissionable isotope convertible to a thermally fissionable isotope by neutron absorption positioned in said container, an outlet tank connected to said outlet, an inlet tank connected to said inlet, each of said tanks having a wall in common with a portion of the wall of said container, conduit means connecting said inlet and outlet tanks outside of and close to the remaining portion of the wall of said container, said tanks and said conduit means completely enclosing said container, means for circulating said thermally fissionable isotope over the path thus provided, and means for circulating a coolant around said conduit means.

2. An isotope conversion device comprising a reaction tank, a thermally fissionable isotope dispersed in a liquid moderator in said reaction tank and in an amount sufficient to support a chain reaction, a container surrounding said reaction tank, an inlet and outlet for said reaction tank passing through said container, a non-thermally fissionable isotope convertible to a thermally fissionable isotope by neutron absorption positioned in said container, an outlet tank connected to said outlet, an inlet tank connected to said inlet, each of said tanks having a wall in common with a portion of the wall of said container, conduit means connecting said inlet and outlet tanks outside of and close to the remaining wall portion of said container, said conduit means forming with said tanks a complete enclosure for said container, said conduit means terminating in said inlet tank in a plurality of spray nozzles, a cooling coil in said inlet tank in the path of liquid issuing from said spray nozzles, and means for circulating said thermally fissionable isotope over the path thus provided.

3. An isotope conversion device comprising a reaction tank, a thermally fissionable isotope dispersed in a liquid moderator in said reaction tank and in an amount sufficient to support a chain reaction, a container surrounding said reaction tank, an inlet and outlet for said reaction tank passing through said container, a non-thermally fissionable isotope convertible to a thermally fissionable isotope by neutron absorption positioned in said container, means for circulating said thermally fissionable isotope through said chamber and said outlet over a path closely adjacent the outer surfaces of said container and through said inlet back into said chamber, and means for cooling said thermally fissionable isotope while in said path.

4. A nuclear reactor apparatus comprising a first means for confining in an annular space a first fluid containing atoms capable of being converted by neutrons into atoms fissionable by thermal neutrons, said annular space comprising an absorption zone, a second means for confining within said annular space a second fluid adapted to emit neutrons, said second means defining a reaction zone, a heat exchanger directly surrounding the first confining means and extending the length thereof, means for abstracting the second fluid from the second confining means and passing it radially outwardly in all directions across one end of said space to one end of the heat exchanger, and means for returning the second fluid from the other end of the heat exchanger radially inwardly in all directions across the other end of said annular space to the second confining means.

5. The apparatus of claim 4 wherein the annular space is connected by inlet and outlet means with a plurality of second heat exchangers positioned outside of and around the first heat exchanger, and means for circulating the first fluid through said second heat exchangers.

6. In a nuclear reactor comprising a reaction zone container for a first fluid composed of a thermally fissionable isotope dispersed in a liquid moderator in an amount sufficient to sustain a chain reaction, a heat exchanger capable of cooling said first fluid, and inlet and outlet means connecting said reaction zone container and said heat exchanger and means for circulating the first fluid through said heat exchanger; the combination therewith, of a second container for a second fluid composed of an isotope convertible by neutron absorption into a second isotope fissionable with thermal neutrons dispersed in a liquid moderator, the second container being positioned so as to substantially surround the reaction zone container and to be directly adjacent to said heat exchanger and said inlet and outlet means.

References Cited in the file of this patent

UNITED STATES PATENTS

| | | |
|---|---|---|
| 1,215,140 | Giller | Feb. 6, 1917 |
| 1,600,106 | Fothergill | Sept. 14, 1926 |
| 1,927,555 | Oetkin | Sept. 19, 1933 |
| 2,206,634 | Fermi et al. | July 2, 1940 |
| 2,708,656 | Fermi et al. | May 17, 1955 |
| 2,736,696 | Wigner et al. | Feb. 28, 1956 |

FOREIGN PATENTS

| | | |
|---|---|---|
| 114,150 | Australia | May 2, 1940 |
| 861,390 | France | Oct. 28, 1940 |
| 648,293 | Great Britain | Jan. 3, 1951 |
| 233,011 | Switzerland | Oct. 2, 1944 |

OTHER REFERENCES

Naturwissenschaften, vol. 27, 1939, pp. 402–410.

Power, July 1940, pp. 56–59.

A General Account of the Development of Methods of Using Atomic Energy for Military Purposes Under the Auspices of the U. S. Gov't, by H. D. Smyth, pp. 22–26, August 1945.

Goodman: "The Science and Engineering of Nuclear Power," vol. 1, p. 275, Addison-Wesley (1947).

Kelly et al.; Phy. Rev., 73, 1135–9 (1948).